United States Patent [19]

Dunavin et al.

[11] Patent Number: 4,545,689

[45] Date of Patent: Oct. 8, 1985

[54] THERMOSTAT CALIBRATION APPARATUS

[75] Inventors: Timothy E. Dunavin, Rock Falls; Michael A. Scarantino, Dixon, both of Ill.

[73] Assignee: Harper-Wyman Company, Hinsdale, Ill.

[21] Appl. No.: 676,583

[22] Filed: Nov. 30, 1984

[51] Int. Cl.⁴ .............................................. G01K 15/00
[52] U.S. Cl. ......................................... 374/1; 73/1 R
[58] Field of Search ............... 374/1; 73/1 R; 324/63

[56] References Cited

U.S. PATENT DOCUMENTS

| | | | |
|---|---|---|---|
| 3,741,476 | 6/1973 | Travaglio | 374/1 |
| 3,757,207 | 9/1973 | Hire | 374/1 |
| 3,902,351 | 9/1975 | Kreps | 374/1 |
| 4,377,346 | 3/1983 | Beaver et al. | 374/1 |

Primary Examiner—Charles Frankfort
Assistant Examiner—Thomas B. Will
Attorney, Agent, or Firm—Mason, Kolehmainen, Rathburn & Wyss

[57] ABSTRACT

Thermostat calibration apparatus is provided having a locking arrangement to ensure proper calibration whereby operator discretion is eliminated. The thermostat calibration apparatus includes circuitry for generating a calibration signal having a predefined time window and corresponding to a predetermined calibration temperature. The thermostat calibration apparatus further includes circuitry for generating control time windows corresponding to a predefined calibration accuracy and circuitry for detecting the ON operation of the thermostat relative to the calibration window and control windows.

5 Claims, 2 Drawing Figures ated in FIG. 1.

THERMOSTAT CALIBRATION APPARATUS

BACKGROUND OF THE INVENTION

The present invention generally relates to apparatus for calibrating thermostats, and more particularly, to thermostat calibration apparatus including a locking arrangement to ensure proper calibration operation.

Various thermostat calibration systems are known in the art that are generally suitable for their intended use. However, in such known systems the accuracy of the calibration of a particular thermostat is determined by the discretion of the operator. Accordingly, it is highly desirable to provide thermostat calibration apparatus that enables accurate and efficient calibration operations while eliminating operator discretion.

SUMMARY OF THE INVENTION

It is an object of the present invention to provide improved thermostat calibration apparatus.

It is another object of the present invention to provide an improved thermostat calibration apparatus that eliminates inaccuracies resulting from operator discretion.

Another object of the present invention is to provide improved thermostat calibration apparatus having a locking arrangement to ensure proper calibration whereby operator discretion is eliminated.

Briefly, the present invention provides apparatus for calibrating a thermostat to a predefined accuracy. The thermostat calibration apparatus includes circuitry for generating a calibration signal having a predefined time window and corresponding to a predetermined calibration temperature, means for generating control time windows corresponding to the predefined calibration accuracy and means for detecting the ON operation of the thermostat relative to said calibration and control windows. The calibration apparatus further includes means for locking the thermostat and means for disabling the locking means responsive to a detected ON operation within the calibration time window whereby proper calibration of the thermostat is assured.

According to the method of the invention, a calibration signal is generated that corresponds to a predetermined calibration temperature. The calibration signal is provided with a predefined time window. Control time windows are generated that correspond to a predefined calibration accuracy. The ON operation of the thermostat is detected relative to the calibration signal time window and control time window. Proper calibration of the thermostat corresponds to a detected ON operation within the calibration signal time window.

BRIEF DESCRIPTION OF THE DRAWINGS

The above and other objects and advantages and novel features of the present invention will become apparent from the following detailed description of the preferred embodiment of the calibration apparatus illustrated in the accompanying drawings wherein.

DESCRIPTION OF THE PREFERRED EMBODIMENT

Figure 1:
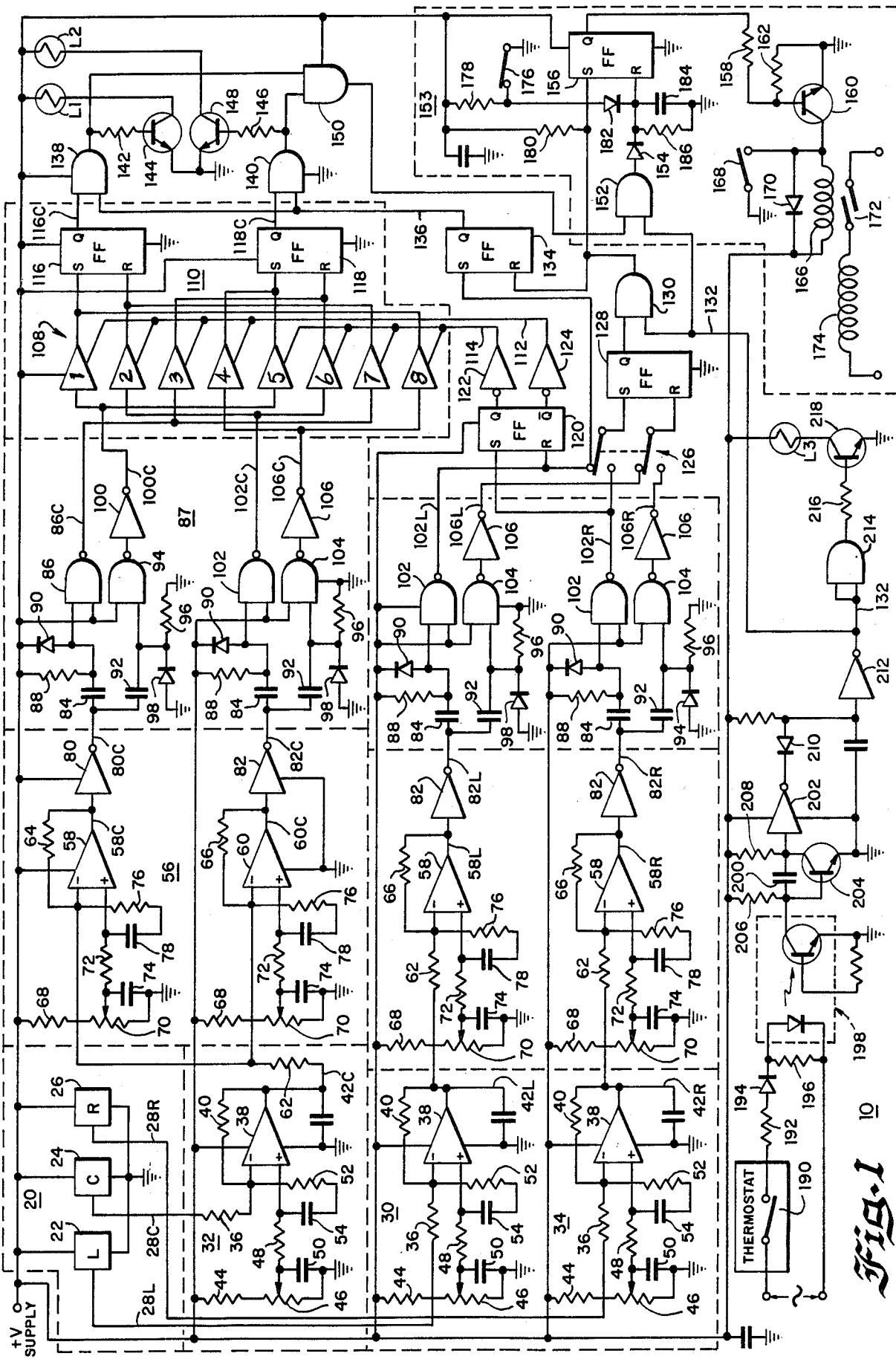
FIG. 1 is a schematic diagram illustrating the calibration apparatus in accordance with the present invention.
Figure 2:
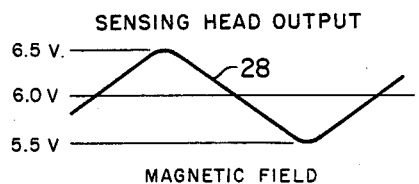
FIG. 2 is a waveform chart illustrating the operation of the calibration apparatus of FIG. 1.
Figure 2:
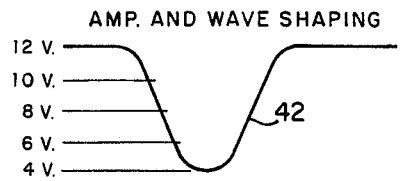
Figure 2:
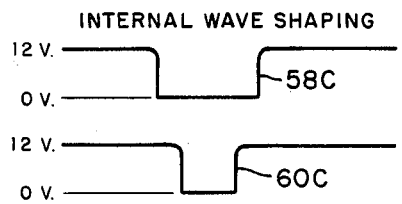
Figure 2:
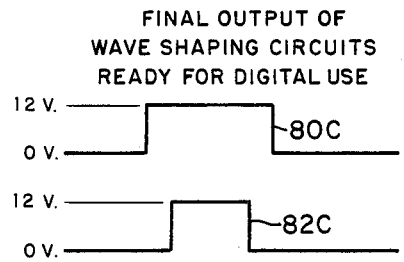
Figure 2:
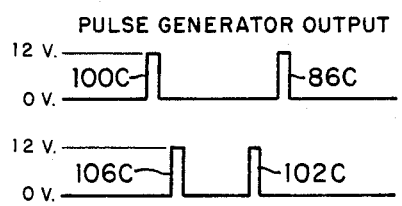
Figure 2:
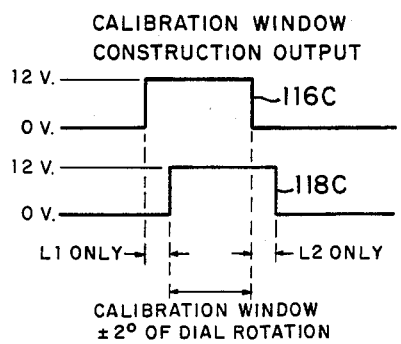
Figure 2:
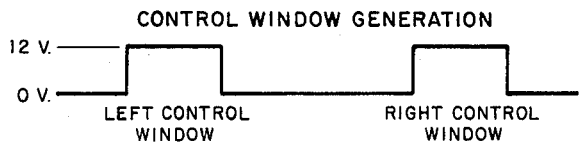
Figure 2:
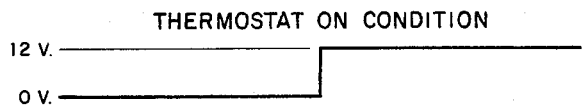
Figure 2:
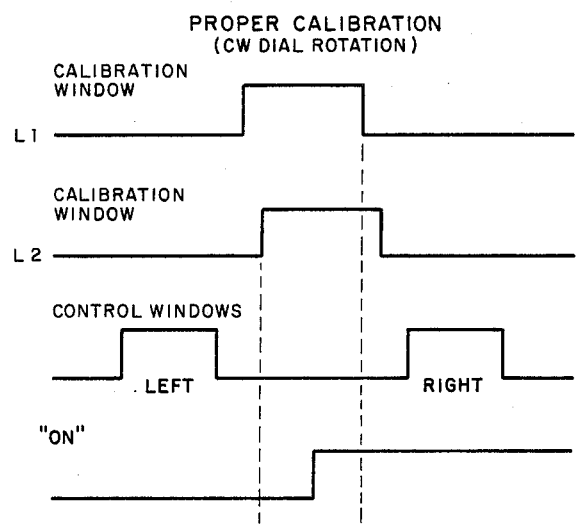
Figure 2:
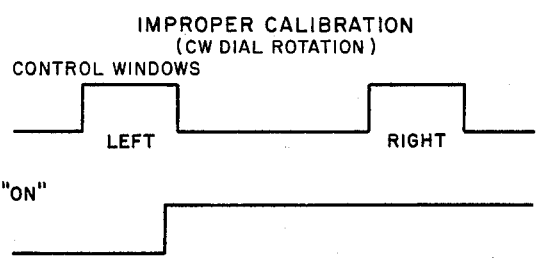

Referring to FIG. 1, there is shown a schematic diagram illustrating the calibration apparatus constructed in accordance with the principles of the present invention and designated as a whole by the reference numeral 10. Referring also to FIG. 2, there is provided a waveform chart to aid in the understanding of the circuitry illustrated in FIG. 1.

The calibration apparatus 10 includes a sensing head 20 that contains three Hall effect sensors 22, 24, 26. The Hall effect sensors 22, 24, 26 are designated according to the positions of left L, center C, and right R, respectively. The sensing head 20 is mounted proximate to a calibration dial (not shown) that includes a magnet to define a desired calibration position when rotated relative the sensing head 20 and the center Hall effects sensor 24. The left sensor 22 and the right sensor 26 are positioned relative the center sensor 24 to establish a desired accuracy for the calibration apparatus 10.

The Hall effect sensors 22, 24, 26 may be, for example, a type TL173C manufactured by Texas Instruments, Incorporated of Dallas, Tex. The outputs 28L, 28C, 28R of the Hall effect sensors 22, 24, 26 are illustrated in FIG. 2 as a generally sinusoidal waveform 28 as a function of time. The output 28L, 28C, 28R of the sensors 22, 24, 26 are separately coupled to amplifier and waveform shaping amplifier circuits 30, 32, 34. Identical circuitry is used for each of the wave shaping amplifier circuits 30, 32, 34 and the same reference characters are used with respect to the circuits 30, 32, 34. The wave shaping circuitry will be described with respect to the amplifier circuit 32 that is coupled to the output 28C of the center positioned Hall effect sensor 24.

The output 28C is coupled through a resistor 36 to an inverting input of an operational amplifier 38. A resistor 40 is connected between the inverting input of amplifier 38 and the output thereof in a conventional manner. The output of the operational amplifier 38 is designated 42C. A biasing circuit including resistors 44, 46 and 48 and capacitor 50 is coupled between the positive supply voltage terminal, +V supply and the noninverting input of operational amplifier 38. A series connected resistor 52 and capacitor 54 are coupled between the inverting input and noninverting input of the operational amplifier 38. The waveform 42 shown in FIG. 2 illustrates the outputs 42L, 42C, 42R of the wave shaping amplifier circuits 30, 32, 34.

The output 42C of the waveform shaping amplifier circuit 32 is applied to an internal waveform shaping circuit 60. The internal waveform shaping circuit 56 includes operational amplifiers 58, 60 that are configured as shown to provide output waveforms 58C, 60C as illustrated in FIG. 2. The output 42C of the operational amplifier 38 is coupled through a resistor 62 to the inverting input of both operational amplifiers 58, 60. A feedback resistor 64 is coupled between the output 58C and the inverting input of operational amplifier 58. A resistor 66 is connected between the output 60C and the inverting input of the operational amplifier 60. A biasing circuit including resistors 68, 70, 72 and capacitor 74 is coupled between the positive supply voltage terminal and the noninverting input operational amplifier 58. A series connected resistor 76 and a capacitor 78 are coupled between the inverting input and the noninverting input of the operational amplifier 58. Identical biasing circuitry is used for the operational amplifier 60 as is used for operational amplifier 58 and the same reference characters are used. The values of feedback resistors 64, 66 are selected to determine the desired operating voltages of the input waveform 42C; for example, 10 volts for operational amplifier 58 and at 6 volts for operational amplifier 60 as illustrated in FIG. 2.

An inverter 80 is coupled to the output 58C of operational amplifier 58 and an inverter 82 is coupled to the output 60C of operational amplifier 60 to provide the final waveform shaping. The output waveforms 80C, 82C of the inverters 80, 82 is suitable for digital use.

The output 80C of the inverter 80 is coupled through a capacitor 84 to an input of a NAND gate 86 that forms part of a pulse generator circuit 87. A biasing circuit including a parallel connected resistor 88 and a diode 90 is coupled between the junction of capacitor 84 and NAND gate 86 and +V supply. The second input of the NAND 86 is connected to the +V supply. The output 86C of NAND gate 86 is illustrated in FIG. 2 under the section designated pulse generator output.

The output 80C additionally is coupled through a capacitor 92 to a NAND gate 94. A biasing circuit including a parallel connected resistor 96 and a diode 98 is coupled between ground and the junction of capacitor 92 and NAND 94. The output of NAND gate 94 is applied to an inverter 100. The output 100C of inverter 100 is illustrated in FIG. 2 under the section designated pulse generator output.

The remaining part of the pulse generator circuit 87 is formed of two NAND gates 102, 104 and an inverter 106. The same reference characters are employed to designate idential components as described hereinbefore with respect to biasing NAND gates 86, 94 and inverter 100. The output 82C of inverter 82 is coupled to an input of NAND gate 102 and to an input of NAND gate 104. The output of NAND gate 104 is applied to the inverter 106 that produces an output 106C. The outputs 102C, 106C are illustrated in FIG. 2 under the section designated pulse generator output.

The outputs 86C, 100C, 102C, 106C of the pulse generator circuit 87 are applied to a noninverting octal buffer circuit 108 that forms part of a calibration window circuit 110. The noninverting octal buffer 108 may be, for example, a type 74C244 manufactured by National Semiconductor. The gates 1–4 of buffer 108 are enabled by a control signal on a line 112. Alternatively, the gates 5–8 of buffer 108 are enabled by a control signal on a line 114. As is described hereinafter, the control signals on lines 112, 114 correspond, respectively, to the counterclockwise or clockwise direction of rotation of the calibration dial.

The output 86C is applied to gates 3 and 7 of buffer 108. The output 100C is applied to gates 1 and 5 of buffer 108. The output 102C is applied to gates 2 and 6 of buffer 108. The output 106C is applied to gates 4 and 8 of buffer 108. The outputs of the gates 1–8 are applied to the Set and Reset inputs of two Set-Reset S-R flip-flops FF 116, 118, as shown.

The output of the pulse generator circuit 87 is illustrated by the waveforms 116C, 118C under the section designated calibration window construction. The output of FF 116 that is represented by waveform 116C has a leading edge corresponding to the output 100C and a trailing edge corresponding to the output 102C. The output of FF 118 that is represented by waveform 118C has a leading edge corresponding to the output 106C and a trailing edge corresponding to the output 86C.

The outputs 102R, 102L of the waveform shaping circuitry that is coupled to the Left sensor 22 and the Right sensor 26, are applied to the Set, Reset inputs of a S-R FF 120, respectively. The Q output of FF 120 is applied to a buffer gate 122. The output of gate 122 corresponds to the control signal on line 114 that enables gates 5–8 of buffer 108 for a counterclockwise rotation of the calibration dial whereby the right Hall effect sensor 26 is first activated.

The $\overline{Q}$ output of FF120 is applied to a buffer gate 124. The output of gate 124 corresponds to the control signal 112 that enables gates 1–4 of buffer 108 for a clockwise rotation of the calibration dial whereby the left Hall effect sensor 22 is first activated.

A double-pole double-throw DPDT relay or mechanically activated switch 126 is employed to couple the outputs 102L, 106L to the set, reset inputs of a SR FF 128 corresponding to a clockwise rotation of the calibration dial and to couple the outputs 102R, 106R to the set, reset inputs of the FF 128 corresponding to a counterclockwise rotation of the calibration dial. The Q output of FF 128 is applied to an input of a dual input AND gate 130. A thermostat ON signal 132 is applied to the second input of AND gate 130. The output of AND gate 130 is applied to the reset input of a S-R FF 134. The output 102L is applied to the set input of S-R FF 134. The Q output of FF 134 provides an enable signal on a line 136 to ensure a proper calibration sequence, as is described hereinafter.

The enable signal on line 136 is applied to a first input of two dual-input AND gates 138, 140. The output 116C of the pulse generator circuit 87 is applied to the second input of AND gate 138. The output of AND gate 138 is coupled through a resistor 142 to the base of an NPN transistor 144. The emitter of NPN transistor 144 is connected to ground and the collector thereof is connected to an indicator lamp L1 that is coupled to +V supply, as shown. The output of AND gate 138 is a logic one or high level with a high input of both enable signal on line 136 and output 116C. The high output of AND gate 138 renders NPN transistor 142 conductive, whereby indicator lamp L1 is turned on.

The output 118C of the pulse generator circuit 87 is applied to the second input of the AND gate 140. The output of AND gate 140 is coupled through a resistor 146 to the base of an NPN transistor 148. The emitter of transistor 148 is connected to ground and the collector thereof is connected to an indicator lamp L2 that is coupled to +V supply, as shown. A high output of AND gate 140 corresponds to a high input of both enable signal 136 and output 118C. The high output of AND gate 140 renders the NPN transistor 148 conductive whereby indicator lamp L2 is turned on.

The outputs of AND gates 138, 140 are applied to the inputs of a dual-input AND gate 150. The output of AND gate 150 is high when both output of AND gates 138, 140 are high, whereby both indicator lamps L1, L2 are turned on. The high output of AND gate 150 corresponds to the calibration time window that is illustrated in FIG. 2 under the section designated calibration window construction output.

The output of AND gate 150 is applied to a first input of a dual-input AND gate 152 that forms part of a thermostat locking circuit 153. The thermostat ON signal on line 132 is applied to a second input of the AND gate 152. A high output of AND gate 152 corresponds to a proper calibration sequence. The output of AND gate 152 is coupled through a diode 154 to the reset input of a S-R FF 156. The output of AND gate 130 is applied to the set input of FF 156. The Q output of FF 156 is coupled through a resistor 158 to the base of an NPN transistor 160. The emitter of NPN transistor 160 is coupled to ground. A biasing resistor 162 is connected between the base and emitter of transistor 160. The collector of transistor 160 is connected to a first terminal of a relay winding 166 that has a second terminal connected to +V supply. A parallel connected manually operated switch 168 and diode 170 is connected across the relay winding 166. The switch 168 is closed by the operator of the calibration apparatus 10 to initialize the locking circuit 153 at the start of the calibration procedure.

The relay winding 166 operates relay contacts 172 that are connected in series with an air solenoid 174. The air solenoid 174 engages a test fixture that holds thermostat under test until a proper calibration sequence is detected.

In operation, the NPN transistor 160 is rendered nonconductive by a low Q output of FF 156.

The relay winding 166 is deenergized with transistor 160 being nonconductive which releases contacts 172 and thereby deenergizes air solenoid 174 so that the fixture is released and the thermostat under test can be removed.

A manually operated switch 176 is provided to enable the release of a defective thermostat for which a proper calibration sequence cannot be detected. A biasing circuit including resistors 178, 180, a diode 182, a capacitor 184 and a resistor 186, arranged as shown, is coupled to the switch 176. The switch 176 is normally open and is closed to reset the FF 184 and thereby release the defective thermostat.

A thermostat 190 to be calibrated is coupled to an AC voltage supply terminal and through a series-connected resistor 192, diode 194 and resistor 196 to the common AC voltage supply terminal, as shown. An opto isolator circuit 198, such as a type 4N25, manufactured by Motorola, Inc., is employed to obtain a DC signal corresponding to an ON operation of the thermostat 190. The input of opto isolator circuit 198 is connected across the resistor 190. The output of opto isolator circuit 198 is coupled through a capacitor 200 to an inverter 202 and is coupled to the base of an NPN transistor 204. A biasing resistor 206 is connected between the base of the NPN transistor 204 and +V supply. The emitter of transistor 204 is connected to ground and the collector thereof is coupled through a resistor 208 to +V supply. The output of inverter 202 is applied through a diode 210 to an inverter 212. The output of inverter 212 is the thermostat ON signal 132. A high thermostat ON signal 132 corresponds to an ON operation of the thermostat 190. The low thermostat ON signal corresponds to an OFF operation of the thermostat 190. The thermostat ON signal 132 is illustrated in FIG. 2 under the section designated thermostat on condition.

The thermostat ON signal is applied to both inputs of a dual-input AND gate 214. The output of AND gate 214 is coupled through a resistor 216 to the base of an NPN transistor 218. The emitter of transistor 218 is grounded and the collector thereof is coupled to an indicator lamp L3. The NPN transistor 218 is rendered conductive by a high output of AND gate 214 that corresponds to a high thermostat ON signal 132 and thereby the indicator lamp L3 is turned on.

Under the section designated proper calibration in FIG. 2, waveforms are provided illustrating a proper calibration sequence with the calibration dial being rotated in a clockwise direction. The calibration window is indicated by broken lines and corresponds to the time window that both indicator lamps L1 and L2 are turned on. The left and right control windows correspond to outputs of the wave shaping circuitry that are coupled to the left positioned Hall effect sensor 22 and the right positioned Hall effect sensor 26. The ON operation of the thermostat ON signal is shown within the calibration window indicating that the thermostat has been properly calibrated. Accordingly, indicator lamps L1, L2 and L3 are simultaneously turned on and indicate to the operator of the calibration apparatus 10 that the thermostat 190 is properly calibrated. The air solenoid 174 is deenergized so that test fixture is released and the thermostat 190 can be removed.

Under the section designated improper calibration the thermostat ON signal is illustrated as having the ON operation occur outside the calibration window whereby the operator of the calibration apparatus 10 is required to further adjust the thermostat 190 by adjusting the calibration adjusting mechanism, such as by rotating a calibration screw, in the thermostat 190. The operator again rotates the calibration dial to check the adjustment of the thermostat 190 for proper calibration.

Obviously, many modifications and variations of the present invention are possible in light of the above teachings. Thus, it is understood that, within the scope of the appended claims, the invention may be practiced otherwise than as specifically described hereinabove.

What is claimed and desired to be secured by Letters Patent is:

1. Apparatus for calibrating a thermostat comprising:
   means for generating a calibration signal corresponding to a predetermined calibration temperature, said calibration signal having a predefined calibration time window;
   means for generating control time window signals corresponding to a predefined calibration accuracy; and
   means for detecting an ON operation of the thermostat relative to said calibration window and said control windows to indicate the state of calibration.

2. The calibration apparatus as claimed in claim 1 further comprising visual indicating means for indicating proper calibration.

3. The calibration apparatus as claimed in claim 1 further comprising means for locking the thermostat and means for disabling said locking means responsive to a detected ON operation within said calibration time window.

4. A method of calibrating a thermostat comprising the steps of:
   a. generating a calibration signal corresponding to a calibration temperature and having a predefined calibration time window;
   b. generating control time windows corresponding to a predefined calibration accuracy; and
   c. detecting an ON operation of the thermostat relative to said calibration window and said control windows to indicate the state of calibration.

5. A method of calibrating a thermostat as claimed in claim 4 further comprising the steps of:
   locking the thermostat and releasing the thermostat in response to a detected ON operation within said calibration window.

* * * * *